UNITED STATES PATENT OFFICE.

JEAN PEETERS, OF SCHAERBEEK, BELGIUM.

PROCESS OF MAKING YEAST EXTRACTS.

SPECIFICATION forming part of Letters Patent No. 652,910, dated July 3, 1900.

Application filed November 30, 1897. Serial No. 660,315. (No specimens.)

*To all whom it may concern:*

Be it known that I, JEAN PEETERS, a citizen of the Kingdom of Belgium, residing at Schaerbeek, near Brussels, Belgium, have invented certain new and useful improvements in processes for the production of new vegetable extracts and new vegetable peptones of commercial utility by the transformation of all kinds of yeasts and these new products of commercial utility themselves, of which the following is a specification.

This invention relates to a new or improved process for extracting from yeast products capable of being employed in the same manner as are commercial extracts of meat or for other commercial purposes under the form of extracts, peptonoids, or peptones.

Before being treated the yeast may be pressed and dried or left in a liquid or pasty form. The yeast is first diluted in water and then strained. It is then washed several times in water acidulated, preferably, with acetic acid. The object of this washing is to remove from the yeast all bad or disagreeable odor or taste, to free it from certain organic substances and from an excess of mineral substances which it contains, and to impart greater permeability to its cells. I have obtained the best products by treating the yeast with four successive washings in a solution of one-thousandth. After the last washing the yeast is allowed to drain. Water is then added to it in the proportion of about two or three times the weight of the yeast in its natural state—that is, about eight parts, by weight, of water to one part, by weight, of dry yeast. To this mixture is then added a small quantity of an acid suitable to render soluble and to convert the albumenoidal principles of the yeast and to effect the elimination of the potassium salts which are still contained therein in excess. The mixture of yeast, water, and acid is then raised to a temperature of from 40° to 60° centigrade and maintained during the time necessary for producing the transformation into the products that form the object of this invention. This operation may sometimes necessitate as much as twenty-four hours heating. If the whole operation of digestion is carried on under sufficient pressure, the temperature of the mixture might be raised to and maintained at 120° centigrade, or thereabout. After cooling the solution is filtered. Then the filtered liquid is evaporated slowly, preferably until it has attained a syrupy or pasty consistency. This evaporation may be effected by any known suitable means; but the temperature must always be kept below 100° centigrade. After cooling the evaporated product is subjected to one or more washings with alcohol in such a manner as to well dissolve it while agitating it by suitable means. After a sufficient period of rest the alcohol is decanted off, and the residue, which thenceforth retains its albumenoidal principles in a perfectly-purified state, is dissolved in about three times its weight of water. A suitable quantity of sodium chloride may then be added to the solution, which is then filtered and evaporated to the required consistency.

I claim—

A process for the manufacture of extracts of yeast consisting in washing the yeast, after it has been strained, in a solution acidulated with acetic acid, dissolving and digesting at a temperature of at least 40° centigrade the washed yeast with an addition of a suitable acid, washing the product of the digestion with alcohol, and evaporating such product to the desired consistency.

JEAN PEETERS.

Witnesses:
K. FERON,
AL. VANBIERD.